R. B. BENNETT.
SCREW PUMP.
APPLICATION FILED JAN. 4, 1916.
1,211,390. Patented Jan. 9, 1917.
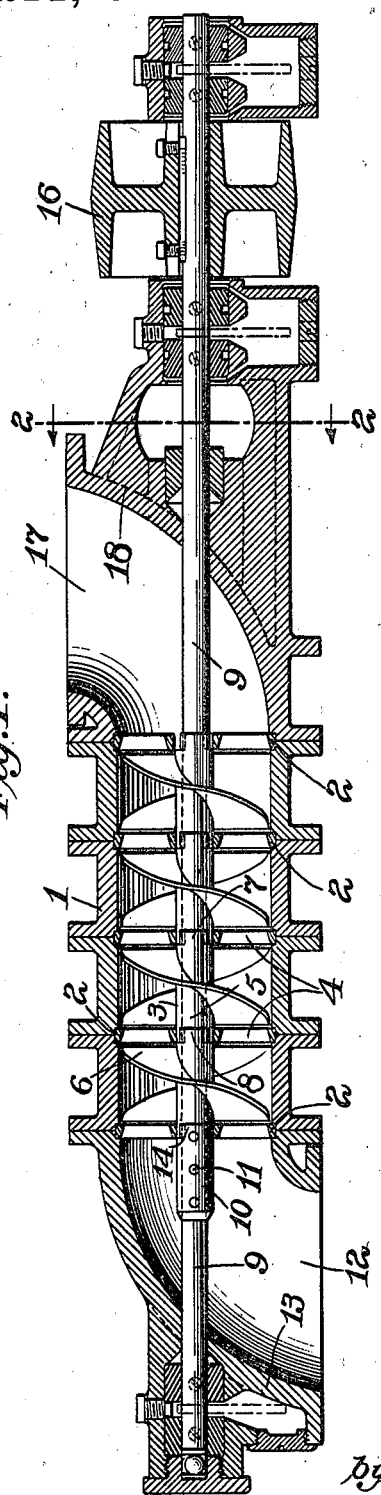
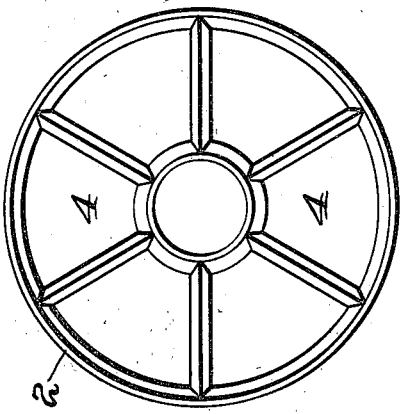
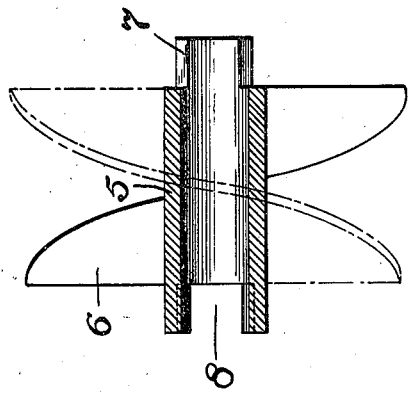
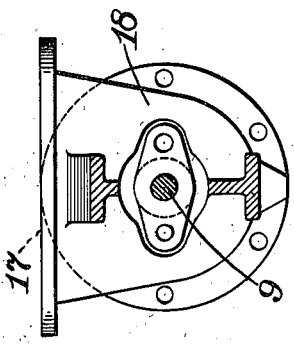
Inventor:
Robert B. Bennett,
by Spear, Middleton, Donaldson & Spear
Attys.

UNITED STATES PATENT OFFICE.

ROBERT B. BENNETT, OF NEW YORK, N. Y., ASSIGNOR TO ERASTUS S. BENNETT, OF NEW YORK, N. Y.

SCREW-PUMP.

1,211,390.  Specification of Letters Patent.  Patented Jan. 9, 1917.

Continuation of application Serial No. 706,654, filed June 29, 1912. This application filed January 4, 1916. Serial No. 70,319.

*To all whom it may concern:*

Be it known that I, ROBERT B. BENNETT, a citizen of the United States, residing at 52 New street, New York city, New York, have invented certain new and useful Improvements in Screw-Pumps, of which the following is a specification.

My invention relates particularly to the mounting of the screw piston upon the shaft of the pump, my object being to avoid the use of keys or other forms of attachment, which would in any way tend to weaken the shaft or render necessary the existence of projections from the hub of the shaft into the working space within the cylinder of the pump. A pump of this character is intended to run at a very high speed, and as the screw piston is of considerable length a long shaft is usually employed. Further, such pumps are of small diameter but yet it is desirable to maintain a maximum working area within the pump cylinder. The clearance between the periphery of the screw piston and the inner wall of the cylinder must be exceedingly slight to prevent "slip" of the fluid, and the shaft must be perfectly straight and no irregularities or projections must occur on the screw piston or the hub or shaft which would interfere with the perfect balance of the rotary piston and the proper working of the pump. With these considerations in mind it will be understood that the use of a key for attaching the screw piston to the hub will not meet the requirements, but is open to serious objection. The cutting of the key-way causes springing of the shaft, and particularly in a shaft of the length required for the best results in a screw pump of small diameter. A shaft that is slightly sprung, if used in a pump of this type, will cause the periphery of the screw piston to rub against the cylinder, causing friction at one side and increasing the clearance at the opposite side, and thus permitting slip of the fluid. Further, a shaft when slightly sprung in an apparatus of this character, because of the end pressure to which the working parts are subjected, tends constantly to increase its irregular form, correspondingly increasing the vibration and friction. Further, the forming of a key-seat in the shaft weakens it and necessitates the use of a shaft of larger diameter than would be otherwise necessary, and this, in turn, requires a larger diameter of the hub of the screw piston, and correspondingly reduces the working area within the cylinder. The use of projections, set screws, bosses and the like are objectionable, as the screw piston will be thrown out of balance and cause vibration, besides causing friction on the fluid and loss of efficiency in the pump.

In carrying out my invention I seek to avoid all of the above objections, and the invention consists in employing a screw piston of sectional form, each section comprising a hub and a screw blade, the different hubs being interlocked one with the other and mounted upon a shaft, which is of plain cylindrical form throughout its extent within the pump cylinder, the connection between the shaft and the screw piston being made with the end section of said piston as will be hereinafter described.

In the accompanying drawings, Figure 1 is a central longitudinal sectional view of a screw pump embodying my invention, the screw piston being shown in the elevation. Fig. 2 is a section on line 2—2 of Fig. 1. Fig. 3 is a detail view of one of the screw piston sections, this being a central sectional view. Fig. 4 is a view of one of the diaphragms.

In these drawings, 1, indicates the cylinder of the pump made up of sections, and 2, indicates diaphragms held between the sections and dividing the cylinder into chambers or spaces in which the sections 3, of the screw piston rotate. These diaphragms have openings 4 for the passage of the water. The sections of the screw piston are made up of a hub 5, and a blade 6, of screw form, the hub being in tubular form, or in the form of a sleeve, having at one end a pair of projections 7, extending from its rim and forming continuations of the cylindrical shell and at the other end, the hub is formed with notches 8, which are provided by cutting away the shell of the hub. The projection 7 on one hub fits into the notch on the adjacent hub and there may be any desired number of these projections and notches or recesses, two being employed in the present case. The interior diameter of the hub is the same as the diameter of the shaft 9, which shaft extends through the casing or cylinder of the pump from end to end and rests in suitable bearings outside of the cylinder or casing. This shaft is connected with the screw piston by a sleeve 10 which is pinned or otherwise secured to the shaft as at 11, the sleeve being located at the end of the screw piston and preferably in the suction head or chamber 12 of the pump, which pump is provided by a curved coupling member or head 13. The sleeve is provided with projections, one of which is shown at 14, forming an extension of the shell of the sleeve, and in the same curved plane thereof, and this projection is adapted to fit in the notch of the hub of the end section of the screw piston. The shaft may be rotated in any suitable manner as by a pulley at 16, and when so rotated its motion will be communicated to the screw piston through the sleeve 10 and the interengaging recesses and projections on the first hub section and the sleeve and this motion will be communicated from section to section of the screw piston through the interlocked hubs of said sections. The interlocked ends of the hubs lie within the central ring or bearing of the diaphragm 2. It will be seen from this construction that the shaft is left intact throughout, except where the sleeve 10 is attached thereto, no key seat being necessary, and as the shaft has its full strength and is not subjected to any action tending to spring it, a shaft of small diameter may be used, and a piston hub of the minimum diameter may be employed, and thus a maximum working space will be provided in which the screw piston may work. It will be also noticed that there are no projections, set screws, pins or other devices employed for fixing the hubs of the piston sections to the shaft, and thus the balance of the piston may be preserved and no obstructions of the flow of the fluid will exist. Because of dispensing with such fastening devices as a key, a screw, pin or the like, the shell of the piston hubs may be kept down to a minimum thickness to keep the diameter of the pump down to a minimum.

It will be observed that the sectional character of the pump is carried out with regard to the cylinder and also the piston, enabling any section to be removed, and this is true also as to the diaphragms between which the sections of the piston work. At the other end of the pump from the chamber 12 there is another chamber 17, formed by a curved shell 18.

I claim as my invention:—

1. In combination in a screw pump, a cylinder, a sectional screw piston having hubs interlocking, a shaft extending through said hubs and diaphragms within the cylinder surrounding the interlocking ends of the hubs, substantially as described.

2. In combination in a screw pump, a cylinder made up of sections, a screw piston made up of sections with interlocking hubs, a shaft extending through the hubs and diaphragms held between the sections of the cylinder and surrounding the interlocking ends of the hubs, substantially as described.

In testimony whereof, I affix my signature in presence of two witnesses.

ROBERT B. BENNETT.

Witnesses:
MARY B. BENNETT,
C. B. WILKES.